US010345000B2

(12) United States Patent
Horie et al.

(10) Patent No.: US 10,345,000 B2
(45) Date of Patent: Jul. 9, 2019

(54) AIR-CONDITIONING APPARATUS AND AIR-CONDITIONING SYSTEM (71) Applicant: Mitsubishi Electric Corporation, Tokyo (JP)

(72) Inventors: Hayato Horie, Tokyo (JP); Mamoru Hamada, Tokyo (JP); Masaki Toyoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 372 days.

(21) Appl. No.: 15/307,930

(22) PCT Filed: May 14, 2014

(86) PCT No.: PCT/JP2014/062831
§ 371 (c)(1),
(2) Date: Oct. 31, 2016

(87) PCT Pub. No.: WO2015/173908
PCT Pub. Date: Nov. 19, 2015

(65) Prior Publication Data
US 2017/0051941 A1 Feb. 23, 2017

(51) Int. Cl.
*F24F 12/00* (2006.01)
*F24F 13/04* (2006.01)
(Continued)

(52) U.S. Cl.
CPC .......... *F24F 12/006* (2013.01); *F24F 1/0007* (2013.01); *F24F 13/04* (2013.01);
(Continued)

(58) Field of Classification Search
CPC .. F24F 12/006; F24F 2120/10; F24F 2110/10; F24F 2110/12; F24F 11/30; F24F 1/0007; F24F 13/04
See application file for complete search history.

(56) References Cited

U.S. PATENT DOCUMENTS

2004/0250561 A1* 12/2004 Kim ...................... F24F 1/0007
62/259.1
2005/0028545 A1* 2/2005 Hebert .................. F24F 12/006
62/274
(Continued)

FOREIGN PATENT DOCUMENTS

DE       10315802 A1 * 10/2004 ............ F24D 11/003
DE  202015105649 U1 * 11/2015 .............. F24F 3/044
(Continued)

OTHER PUBLICATIONS

International Search Report of the International Searching Authority dated Aug. 5, 2014 for the corresponding international application No. PCT/JP2014/062831 (and English translation).
(Continued)

*Primary Examiner* — Devon Russell
(74) *Attorney, Agent, or Firm* — Posz Law Group, PLC (57) ABSTRACT

An air-conditioning apparatus includes an outside-air processing device including a total heat exchanger exchanging heat between outdoor air and return air, and blowing out the outdoor air from a supply-air outlet port into a room as supply air, an indoor unit including an indoor heat exchanger exchanging heat between the return air and refrigerant, and blowing out the return air from an indoor outlet port as indoor outlet air, a joining unit connecting the supply-air outlet port and the indoor outlet port to join the supply air and the indoor outlet air, an opening-closing unit arranged in the joining unit and opening and closing the joining unit, a supply-air temperature detecting unit detecting a supply-air temperature of the supply air, an indoor outlet temperature detecting unit detecting an indoor outlet temperature of the indoor outlet air, and a control unit controlling an operation of the opening-closing unit based on the supply-air temperature and the indoor outlet temperature.

12 Claims, 6 Drawing Sheets (51) Int. Cl.
  *F24F 1/0007* (2019.01)
  *F24F 11/00* (2018.01)
  *F24F 11/30* (2018.01)
  *F24F 110/10* (2018.01)
  *F24F 110/12* (2018.01)
  *F24F 120/10* (2018.01)

(52) U.S. Cl.
  CPC ....... *F24F 11/30* (2018.01); *F24F 2011/0006* (2013.01); *F24F 2110/10* (2018.01); *F24F 2110/12* (2018.01); *F24F 2120/10* (2018.01); *Y02B 30/563* (2013.01)

(56) References Cited

U.S. PATENT DOCUMENTS

| | | | | |
|---|---|---|---|---|
| 2005/0287944 | A1* | 12/2005 | Choi | F24F 12/006 454/234 |
| 2008/0250800 | A1* | 10/2008 | Wetzel | F24F 1/022 62/179 |
| 2010/0101764 | A1* | 4/2010 | Yang | F24F 3/1411 165/104.31 |
| 2012/0018123 | A1* | 1/2012 | Sheren | F24F 12/006 165/59 |
| 2016/0370029 | A1* | 12/2016 | Kurelowech | F24F 12/006 |

FOREIGN PATENT DOCUMENTS

| | | | | |
|---|---|---|---|---|
| FR | 2964448 A1 | * | 3/2012 | ............ A01K 1/0076 |
| GB | 2491849 A | * | 12/2012 | ............ F24F 12/006 |
| JP | 61-031376 A | | 7/1986 | |
| JP | 04-281142 A | | 10/1992 | |
| JP | 11-051456 A | | 2/1999 | |
| JP | 2005-180885 A | | 7/2005 | |
| JP | 2005-337634 A | | 12/2005 | |
| JP | 2008-116076 A | | 5/2008 | |
| JP | 2008116076 A | * | 5/2008 | ............ F24F 3/1423 |
| JP | 2010-019473 A | | 1/2010 | |
| JP | 2011-012892 A | | 1/2011 | |
| JP | 2011012892 A | * | 1/2011 | |
| JP | 2013-217634 A | | 10/2013 | |

OTHER PUBLICATIONS

3 Air-Conditioning and Facility Design, Handbook of Heating, Air-Conditioning and Sanitary Engineers 12th Edition, Feb. 28, 2010, pp. 268-279 (and partial English translation).

* cited by examiner

AIR-CONDITIONING APPARATUS AND AIR-CONDITIONING SYSTEM

CROSS REFERENCE TO RELATED APPLICATION

This application is a U.S. national stage application of PCT/JP2014/062831 filed on May 14, 2014, the contents of which are incorporated herein by reference.

TECHNICAL FIELD

The present invention relates to an air-conditioning apparatus including an outside-air processing device, and to an air-conditioning system.

BACKGROUND ART

A conventionally known outside-air processing device includes an outside-air processing heat exchanger (direct expansion coil) connected to an indoor unit and an outdoor unit of an air-conditioning apparatus. In this outside-air processing device, air that passes through the outside-air processing heat exchanger to be blown out into a room as outlet air is cooled by the indoor unit and the outdoor unit. Consequently, the temperature of the outlet air tends to decrease, and thus the comfort of residents inside the room may be significantly deteriorated.

To solve this problem, an outside-air processing device configured to reheat the outlet air to be blown out from the outside-air processing device into the room and blow out the reheated outlet air has been proposed. This reheating is performed with use of, for example, an electrothermal heater or a heating coil (part of a condenser). Further, the disclosure in Patent Literature 1 is to provide an air outlet device including a shutter configured to control the flow rate of the outlet air to be blown out into the room, and a deflecting unit configured to guide the direction of the outlet air. The air outlet device is connected to an air-conditioning duct. In Patent Literature 1, the shutter and the deflecting unit are adjusted to control the flow rate of the outlet air for each outlet port, to thereby enhance the efficiency of air conditioning.

CITATION LIST

Patent Literature

Patent Literature 1: Japanese Unexamined Patent Application Publication No. 11-51456 (Claim 1 and pages 3 to 4)

SUMMARY OF INVENTION

Technical Problem

However, the outside-air processing device having the reheating function uses the electrothermal heater, the heating coil, or other heating components, and hence power consumption is increased. Further, to achieve this reheating, valves, expansion valves, or other components are necessary, and thus the manufacturing cost is also increased. Further, the air outlet device disclosed in Patent Literature 1 requires components such as the shutter and the deflecting unit, and thus the number of components and the manufacturing cost are increased.

The present invention has been made in view of the above-mentioned problems. The present invention provides an air-conditioning apparatus capable of enhancing the comfort of residents while minimizing increase in cost, and an air-conditioning system.

Solution to Problem

An air-conditioning apparatus according to one embodiment of the present invention includes an outside-air processing device including a total heat exchanger configured to exchange heat between outdoor air and return air, and to blow out the heat-exchanged outdoor air from a supply-air outlet port into a room as supply air, an indoor unit including an indoor heat exchanger configured to exchange heat between the return air and refrigerant, and to blow out the heat-exchanged return air from an indoor outlet port as indoor outlet air, a joining unit configured to connect the supply-air outlet port and the indoor outlet port to each other so that the supply air and the indoor outlet air are joined with each other at the joining unit, an opening-closing unit arranged in the joining unit and configured to open and close the joining unit, a supply-air temperature detecting unit configured to detect a supply-air temperature of the supply air, an indoor outlet temperature detecting unit configured to detect an indoor outlet temperature of the indoor outlet air, and a control unit configured to control an operation of the opening-closing unit based on the supply-air temperature detected by the supply-air temperature detecting unit and the indoor outlet temperature detected by the indoor outlet temperature detecting unit.

Advantageous Effects of Invention

According to the one embodiment of the present invention, the control unit is configured to control the operation of the opening-closing unit based on the supply-air temperature and the indoor outlet temperature. This opening-closing unit opens the joining unit, to thereby introduce the indoor outlet air to the supply air through the joining unit. With this configuration, the comfort of the residents can be enhanced while the increase in cost is minimized.

DESCRIPTION OF EMBODIMENTS

An air-conditioning apparatus according to embodiments of the present invention is described below with reference to the drawings. Note that, the present invention is not limited to the embodiments described below. Moreover, in the drawings referred to below including FIG. 1, the size relationship between components may be different from the reality.

Embodiment 1

Figure 1:
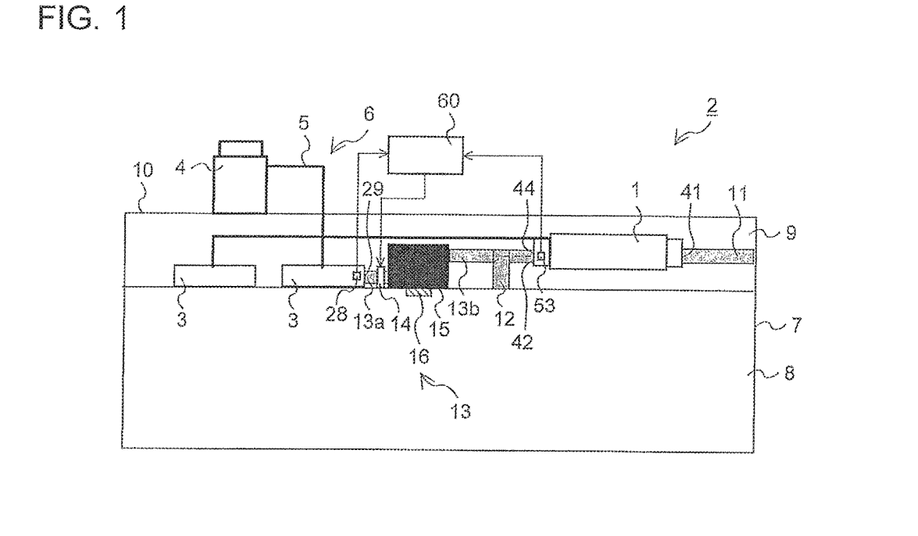
FIG. 1 is a schematic view for illustrating an air-conditioning apparatus 2 according to Embodiment 1 of the present invention.

FIG. 1 is a schematic view for illustrating an air-conditioning apparatus 2 according to Embodiment 1 of the present invention. With reference to FIG. 1, the air-conditioning apparatus 2 is described. The air-conditioning apparatus 2 includes an outside-air processing device 1, two indoor units 3, and one outdoor unit 4 that are connected to each other by pipes 5, and further includes a mixing chamber 15. Of those, the outside-air processing device 1 and the two indoor units 3 are installed in a space 9 above a ceiling of a building 7, and the outdoor unit 4 is installed on a rooftop 10 of the building 7.

The outside-air processing device 1 is connected to the outside of the room through an outdoor duct 11 via an outside-air introducing port 41, and is further connected to the inside of a room 8 through a joining unit 13 and an indoor duct 12. Further, the outside-air processing device 1 has a supply-air outlet port 44 for blowing out supply air SA, and this supply-air outlet port 44 is connected to the mixing chamber 15 by a supply-air duct 13b of the joining unit 13. The mixing chamber 15 has a chamber outlet port 16, and this chamber outlet port 16 connects the mixing chamber 15 and the room 8 to each other. That is, the supply air SA blown out from the supply-air outlet port 44 passes through the supply-air duct 13b to reach the mixing chamber 15, and is then blown out from the chamber outlet port 16 of the mixing chamber 15 into the room 8. Further, the outside-air processing device 1 is configured to introduce return air RA taken in from the indoor duct 12 through a return-air introducing port 42 of the outside-air processing device 1. The indoor duct 12 and the supply-air duct 13b are integrally formed, but those ducts may be formed separately. Further, a plurality of the outside-air processing devices 1 may be installed. Further, only one or a plurality of the indoor units 3 may be installed.

Figure 2:
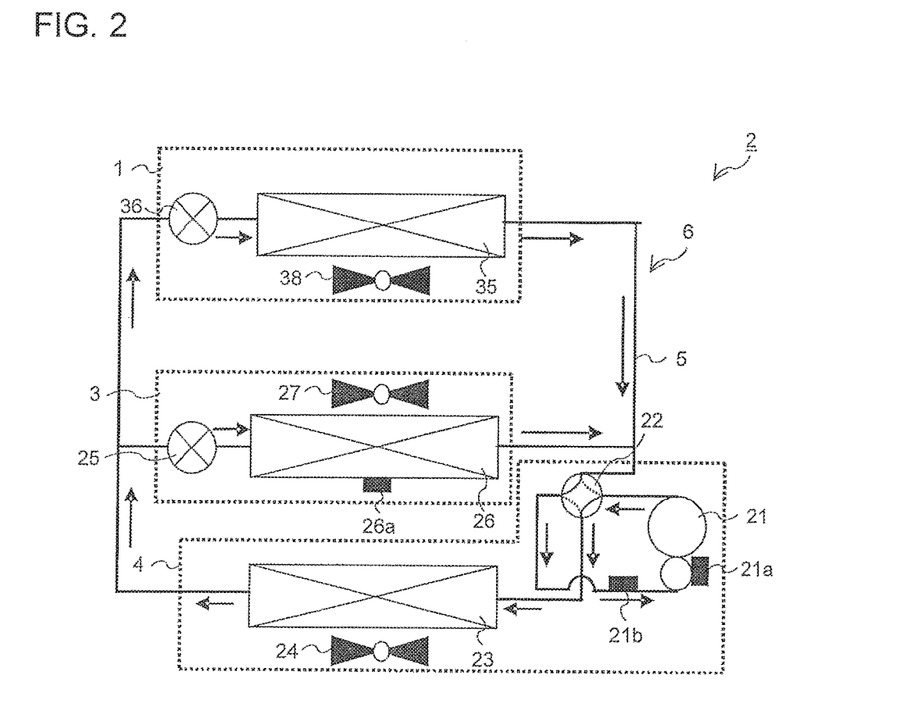
FIG. 2 is a schematic view for illustrating a refrigerant circuit 6 of the air-conditioning apparatus 2 according to Embodiment 1.

FIG. 2 is a schematic view for illustrating a refrigerant circuit 6 of the air-conditioning apparatus 2 according to Embodiment 1. As illustrated in FIG. 2, the outdoor unit 4 includes a compressor 21 configured to compress refrigerant, a four-way valve 22 configured to switch the flowing direction of the refrigerant, and an outdoor heat exchanger 23 configured to exchange heat between outdoor air and the refrigerant. Further, in the vicinity of the outdoor heat exchanger 23, an outdoor fan 24 is installed. This outdoor fan 24 is configured to supply the outdoor air to the outdoor heat exchanger 23.

On the suction side of the compressor 21, a frequency adjusting unit 21a is provided. This frequency adjusting unit 21a is constructed of, for example, an inverter circuit and is configured to adjust the operating frequency of the compressor 21. With this configuration, the discharge temperature of the refrigerant to be discharged from the compressor 21 is adjusted, so that the evaporating temperature of the refrigerant can be adjusted depending on an indoor load. Further, on the suction side of the compressor 21, an evaporating temperature detecting unit 21b is provided. This evaporating temperature detecting unit 21b is configured to detect a temperature of the refrigerant flowing out from an indoor heat exchanger 26 or the outdoor heat exchanger 23 as the evaporating temperature.

The indoor unit 3 includes an expansion unit 25 configured to expand the refrigerant, and the indoor heat exchanger 26 configured to exchange heat between return air and the refrigerant. Further, this indoor heat exchanger 26 is configured to exchange heat between the return air and the refrigerant, and also has a function of blowing out the heat-exchanged return air from an indoor outlet port 29 as indoor outlet air SR. In the vicinity of the indoor heat exchanger 26, an indoor fan 27 is installed. The indoor fan 27 is configured to supply the return air to the indoor heat exchanger 26. On the indoor heat exchanger 26, a suction temperature detecting unit 26a is provided. The suction temperature detecting unit 26a is configured to detect the temperature of the return air supplied by the indoor fan 27.

The outside-air processing device 1 includes an outside-air processing expansion unit 36 configured to expand the refrigerant, and an outside-air processing heat exchanger 35 configured to exchange heat between inflow air SAin and the refrigerant. In the vicinity of the outside-air processing device 1, a supply-air outlet fan 38 is installed. In the refrigerant circuit 6 of the air-conditioning apparatus 2, the outside-air processing expansion unit 36 and the outside-air processing heat exchanger 35 in the outside-air processing device 1 are connected in parallel to the expansion unit 25 and the indoor heat exchanger 26. As described above, in the refrigerant circuit 6 of the air-conditioning apparatus 2, the outside-air processing expansion unit 36 and the outside-air processing heat exchanger 35 in the outside-air processing device 1, the compressor 21, the four-way valve 22, the outdoor heat exchanger 23, the expansion unit 25, and the indoor heat exchanger 26 are connected to each other by the pipes 5.

In the refrigerant circuit 6 of the air-conditioning apparatus 2, during a cooling operation, the refrigerant flows in the order of the compressor 21, the four-way valve 22, and the outdoor heat exchanger 23. Then, the refrigerant is branched into the indoor unit 3 and the outside-air processing device 1 so that the refrigerant flows in the order of the expansion unit 25 and the indoor heat exchanger 26 in the indoor unit 3, and flows in the order of the outside-air processing expansion unit 36 and the outside-air processing heat exchanger 35 in the outside-air processing device 1. Then, the streams of the refrigerant are joined to flow through the four-way valve 22 and to be sucked into the compressor 21.

Next, the operation in the refrigerant circuit 6 is described. First, the cooling operation is described. The compressor 21 sucks the refrigerant, compresses this refrigerant, and discharges the refrigerant in a high-temperature and high-pressure gas state. The discharged refrigerant passes through the four-way valve 22, and then flows into the outdoor heat exchanger 23. The outdoor heat exchanger 23 condenses the refrigerant through heat exchange with the outdoor air. The condensed refrigerant is branched into two directions. One stream of refrigerant flows into the indoor unit 3, and the other stream of refrigerant flows into the outside-air processing device 1. The refrigerant flowing into the indoor unit 3 first flows into the expansion unit 25 of the indoor unit 3, and the expansion unit 25 decompresses the condensed refrigerant. Then, the decompressed refrigerant flows into the indoor heat exchanger 26, and the indoor heat exchanger 26 evaporates the refrigerant through heat exchange with the return air supplied from the indoor fan 27. Subsequently, the room 8 is cooled.

Further, the refrigerant flowing into the outside-air processing device 1 first flows into the outside-air processing expansion unit 36 of the outside-air processing device 1, and the outside-air processing expansion unit 36 decompresses the condensed refrigerant. Then, the decompressed refrigerant flows into the outside-air processing heat exchanger 35, and the outside-air processing heat exchanger 35 evaporates the refrigerant through heat exchange with the inflow air SAin flowing through the outside-air processing device 1. Subsequently, the inflow air SAin is cooled to be blown out into the room 8 as the supply air SA. Then, the refrigerant evaporated in the indoor heat exchanger 26 and the refrigerant evaporated in the outside-air processing heat exchanger 35 are joined, and the joined streams of refrigerant pass through the four-way valve 22 to be sucked into the compressor 21.

Next, a heating operation is described. The compressor 21 sucks the refrigerant, compresses the refrigerant, and discharges the refrigerant in a high-temperature and high-pressure gas state. The discharged refrigerant passes through the four-way valve 22 to be branched into two directions. One stream of refrigerant flows into the indoor unit 3, and the other stream of refrigerant flows into the outside-air processing device 1. The refrigerant flowing into the indoor unit 3 first flows into the indoor heat exchanger 26 of the indoor unit 3, and the indoor heat exchanger 26 condenses the refrigerant through heat exchange with the return air supplied from the indoor fan 27. Subsequently, the room 8 is heated. Then, the condensed refrigerant flows into the expansion unit 25, and the expansion unit 25 decompresses the condensed refrigerant. Further, the refrigerant flowing into the outside-air processing device 1 first flows into the outside-air processing heat exchanger 35 of the outside-air processing device 1, and the outside-air processing heat exchanger 35 condenses the refrigerant through heat exchange with the inflow air SAin owing through the outside-air processing device 1. Subsequently, the inflow air SAin is heated, and is blown out into the room 8 as the supply air SA. The refrigerant condensed in the outside-air processing heat exchanger 35 flows into the outside-air processing expansion unit 36, and the outside-air processing expansion unit 36 expands the condensed refrigerant.

Then, the refrigerant decompressed in the expansion unit 25 and the refrigerant decompressed in the outside-air processing expansion unit 36 are joined. The joined streams of refrigerant flow into the outdoor heat exchanger 23, and the outdoor heat exchanger 23 evaporates the refrigerant through heat exchange with the outdoor air. Then, the evaporated refrigerant passes through the four-way valve 22 to be sucked into the compressor 21.

Figure 3:
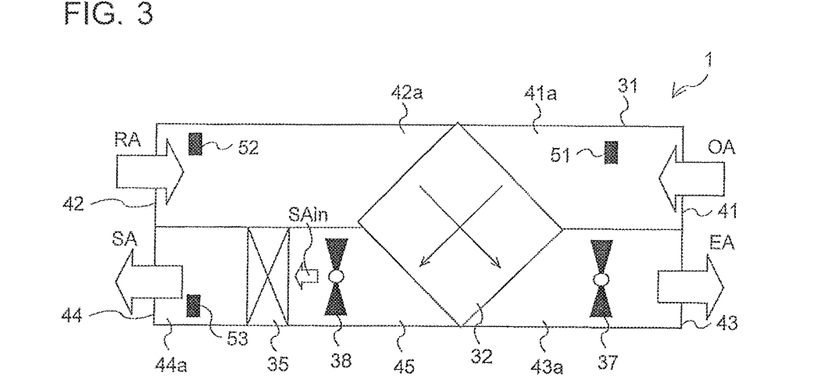
FIG. 3 is a schematic view for illustrating an outside-air processing device 1 according to Embodiment 1.

Next, the outside-air processing device 1 is described. FIG. 3 is a schematic view for illustrating the outside-air processing device 1 according to Embodiment 1. The outside-air processing device 1 is a ventilation device having a function of processing an outside-air load when the outside air is taken into the room 8. As illustrated in FIG. 3, the outside-air processing device 1 includes a main body 31, a total heat exchanger 32 (upstream heat exchanger), an exhaust-air fan 37, the outside-air processing heat exchanger 35 (downstream heat exchanger), and the supply-air outlet fan 38, in addition to the outside-air processing expansion unit 36.

The main body 31 has an outside-air introducing port 41, a return-air introducing port 42, an exhaust-air port 43, and the supply-air outlet port 44. The outside-air introducing port 41 is an opening for introducing outdoor air OA. The outdoor air OA introduced from the outside-air introducing port 41 passes through an outside-air path 41a through which the outdoor air OA flows, to thereby flow into the total heat exchanger 32. Further, the return-air introducing port 42 is an opening for introducing return air RA. The return air RA introduced from the return-air introducing port 42 passes through a return-air path 42a through which the return air RA flows, to thereby flow into the total heat exchanger 32. Those outside-air introducing port 41 and return-air introducing port 42 are opposed to each other.

Further, the exhaust-air port 43 is an opening for exhausting exhaust air EA. The return air RA heat-exchanged by the total heat exchanger 32 passes as the exhaust air EA through an exhaust-air path 43a through which the exhaust air EA flows, and is exhausted from the exhaust-air port 43. Further, the supply-air outlet port 44 is an opening for blowing out the supply air SA. The outdoor air OA heat-exchanged by the total heat exchanger 32 passes as the inflow air SAin through an inflow path 45 through which the inflow air SAin flows, and further passes through the outside-air processing heat exchanger 35. Then, the air passes through a supply-air outlet path 44a through which the supply air SA flows, to thereby be blown out from the supply-air outlet port 44. Those exhaust-air port 43 and supply-air outlet port 44 are opposed to each other. Further, the return-air path 42a through which the return air RA flows and the supply-air outlet path 44a through which the supply air SA flows are adjacent to each other.

The total heat exchanger 32 is arranged in the main body 31, and is configured to exchange heat between the outdoor air OA and the return air RA. The return air RA heat-exchanged by the total heat exchanger 32 is exhausted outside the room by the exhaust-air fan 37 as the exhaust air EA. Further, the outdoor air OA heat-exchanged by the total heat exchanger 32 flows into the outside-air processing heat exchanger 35 as the inflow air SAin. The outside-air processing heat exchanger 35 is configured to exchange heat between the inflow air SAin and the refrigerant in the refrigerant circuit 6. The heat-exchanged inflow air SAin is blown out into the room 8 by the supply-air outlet fan 38 as the supply air SA. As described above, the total heat exchanger 32 is arranged in the main body 31, and is configured to exchange heat between the outdoor air OA and the return air RA, to thereby blow out the heat-exchanged outdoor air OA from the supply-air outlet port 44 into the room 8 as the supply air SA.

The outside-air processing device 1 includes a return-air temperature detecting unit 52, a supply-air temperature detecting unit 53, and an outdoor-air temperature detecting unit 51. The return-air temperature detecting unit 52 is configured to detect a return-air temperature Tra of the return air RA, and is arranged in, for example, the return-air path 42a at the return-air introducing port 42 for introducing the return air RA. Further, as described above, the supply-air temperature detecting unit 53 is configured to detect a supply-air temperature Tsa of the supply air SA, and is arranged in, for example, the supply-air outlet path 44a at the supply-air outlet port 44 for blowing out the supply air SA. Further, the outdoor-air temperature detecting unit 51 is configured to detect a temperature of the outdoor air OA, and is arranged in, for example, the outside-air path 41a at the outside-air introducing port 41 for introducing the outdoor air OA.

Next, the joining unit 13 is described in detail. As illustrated in FIG. 1, the outside-air processing device 1 and the indoor unit 3 are connected to each other by the joining unit 13. The joining unit 13 is configured to connect the supply-air outlet port 44 and the indoor outlet port 29 to each other so that the supply air SA and the indoor outlet air SR are joined with each other. The joining unit 13 includes an indoor outlet duct 13a, the supply-air duct 13b, and the mixing chamber 15.

The indoor unit 3 is connected to the mixing chamber 15 by the indoor outlet duct 13a through the indoor outlet port 29. Further, the indoor outlet duct 13a includes an opening-closing unit 14 configured to open and close the indoor outlet duct 13a. That is, the mixing chamber 15 is arranged on the downstream side of the opening-closing unit 14 in the joining unit 13. A plurality of the mixing chambers 15 may be installed.

Further, the mixing chamber 15 and the supply-air outlet port 44 of the outside-air processing device 1 are connected to each other by the supply-air duct 13b. With this configuration, the mixing chamber 15 mixes the supply air SA blown out from the supply-air outlet port 44 of the outside-air processing device 1 and the indoor outlet air SR blown out from the indoor outlet port 29 of the indoor unit 3 with each other. Then, the supply air SA and the indoor outlet air SR mixed with each other are blown out from the chamber outlet port 16. As described above, the opening-closing unit 14 is arranged in the joining unit 13, and is configured to open and close the joining unit 13. This opening-closing unit 14 is constructed of, for example, a damper. When the opening degree of the damper is adjusted, the flowing amount of the indoor outlet air SR flowing through the joining unit 13 is adjusted, to thereby adjust the mixing ratio between the indoor outlet air SR and the supply air SA.

Figure 4:
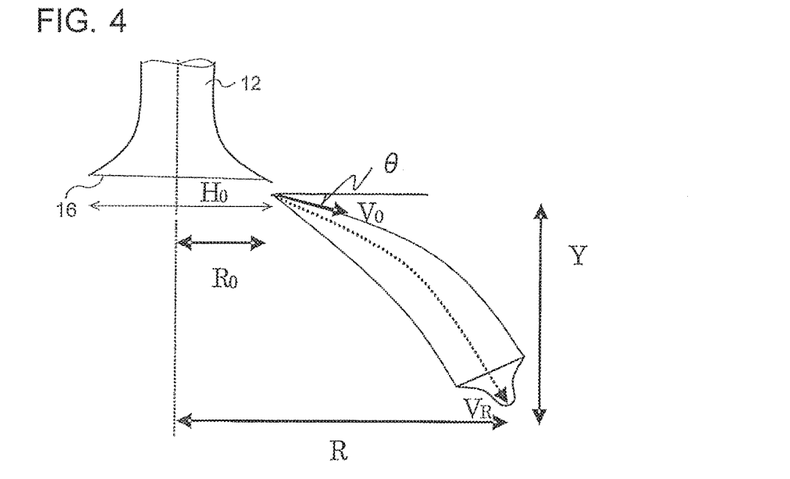
FIG. 4 is a graph for showing a leading end outlet port 16 and a trajectory of mixed air according to Embodiment 1.

Next, the chamber outlet port 16 formed in the mixing chamber 15 to blow out mixed air obtained by mixing the indoor outlet air SR and the supply air SA with each other is described in detail. FIG. 4 is a graph for showing the chamber outlet port 16 and the trajectory of the mixed air according to Embodiment 1. In Embodiment 1, the chamber outlet port 16 has a radial flow-type shape in which the mixed air becomes a radial jet flow. As shown in FIG. 4, the chamber outlet port 16 has a width that gradually increases toward the room 8. In the radial flow-type chamber outlet port 16, a blow-out angle θ at the leading end is set so that, in a range of θ<45°, the minimum arrival distance, that is, the maximum distance at which the maximum wind velocity is maintained at 0.5 m/s is prevented from reaching a living region.

In this case, when the effective width at the leading end of the chamber outlet port 16 is represented by $H_0$ (m), the radius of the chamber outlet port 16 is represented by $R_0$ (m), the wind velocity of the mixed air at the chamber outlet port 16 is represented by $V_0$ (m/s), the maximum wind velocity of the mixed air at an arbitrary position is represented by Vr (m/s), the horizontal distance from the center axis of the chamber outlet port 16 to the arbitrary position is represented by R (m), the outlet port constant is represented by K, the Archimedes number is represented by Ar, the acceleration of gravity is represented by g (m/s$^2$), the gas cubic expansion coefficient is represented by β (° C.$^{-1}$), and the difference between the temperature of the mixed air and the temperature of the room 8 is represented by $\delta t_0$ (° C.), the perpendicular distance from the lower end of the chamber outlet port 16 to the arbitrary position, that is, an arrival distance Y is calculated based on Expression (1), Expression (2), and Expression (3).

[Math. 1]

$$\frac{Y}{H_0} = 0.26 \frac{Ar\cos\theta}{\sqrt{K\cos\theta\{K\cos\theta + (R_0/H_0)\}}} \left(\frac{R}{H_0 \cos\theta}\right)^3 \quad (1)$$

[Math. 2]

$$Ar = g \cdot \beta \cdot \delta t_0 \cdot H_0 \cdot V_0^2 \quad (2)$$

[Math. 3]

$$\frac{Vr}{V_0} = \sqrt{\frac{K\left(\frac{H_0}{R_0}\right)\cos\theta\{K\left(\frac{H_0}{R_0}\right)\cos\theta + 1\}}{\left(\frac{R}{R_0}\right)\{\left(\frac{R}{R_0}\right) - 1\}}} \quad (3)$$

The outlet port constant K is set to about 4 (K) in the case of an isothermal air flow, and is set to 0.83 (K) in the case of a non-isothermal air flow. When, for example, the length of one side of the rectangular room 8 is represented by L, and the height in an upper part of the room 8 higher than the lower half of the room 8 in the height direction is represented by h, the blow-out angle θ or the wind velocity $V_0$ is optimized to satisfy L<h. The lower limit value of $V_0$ is, for example, 2.5 m/s, but this value may be appropriately changed. Further, the number of the chamber outlet ports 16 may be changed to optimize the blow-out angle θ or the wind velocity $V_0$.

Figure 5:
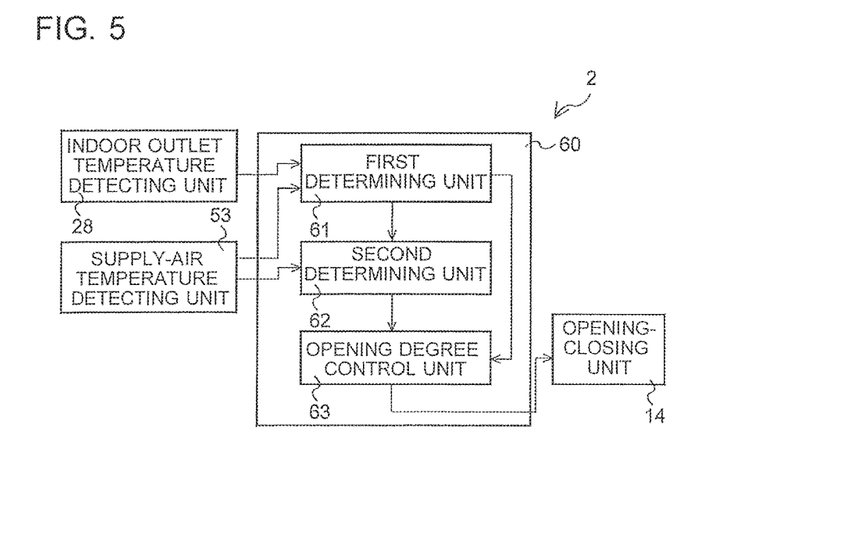
FIG. 5 is a block diagram for illustrating a control unit 60 according to Embodiment 1.

Further, as illustrated in FIG. 1, the air-conditioning apparatus 2 includes an indoor outlet temperature detecting unit 28 and a control unit 60. The indoor outlet temperature detecting unit 28 is configured to detect an indoor outlet temperature Tsr of the indoor outlet air SR, and is arranged in, for example, the indoor unit 3. Further, the control unit 60 is configured to control the operation of the opening-closing unit 14 based on the supply-air temperature Tsa detected by the supply-air temperature detecting unit 53 and the indoor outlet temperature Tsr detected by the indoor outlet temperature detecting unit 28. FIG. 5 is a block diagram for illustrating the control unit 60 according to Embodiment 1. As illustrated in FIG. 5, the control unit 60 includes a first determining unit 61, a second determining unit 62, and an opening degree control unit 63.

The first determining unit 61 is configured to determine whether or not the indoor outlet temperature Tsr detected by the indoor outlet temperature detecting unit 28 is higher than the supply-air temperature Tsa detected by the supply-air temperature detecting unit 53. Further, the second determining unit 62 is configured to determine, when the first determining unit 61 determines that the indoor outlet temperature Tsr is higher than the supply-air temperature Tsa, whether or not the supply-air temperature Tsa detected by the supply-air temperature detecting unit 53 is lower than a predetermined threshold outlet temperature Tsa_th.

This threshold outlet temperature Tsa_th is set to be decreased as a difference between a set outlet temperature or set room temperature and the current actual room temperature inside the room 8 is increased. In this case, for example, the control unit 60 includes a table for storing the relationship between the threshold outlet temperature Tsa_th and the difference between the set outlet temperature or set room temperature and the actual room temperature, and the determination in the second determining unit 62 is made based on this table. Further, the threshold outlet temperature Tsa_th can be set to be increased as time elapses.

The opening degree control unit 63 is configured to control the opening degree of the opening-closing unit 14 based on the determination result of the first determining unit 61 and the determination result of the second determining unit 62. Specifically, the opening degree control unit 63 is configured to, when the second determining unit 62 determines that the supply-air temperature Tsa is lower than the threshold outlet temperature Tsa_th, control the opening-closing unit 14 to open the joining unit 13.

Further, the opening degree control unit 63 has a function of controlling the opening degree of the opening-closing unit 14 to adjust the flowing amount of the indoor outlet air SR flowing through the joining unit 13, based on a difference obtained by subtracting the supply-air temperature Tsa from the threshold outlet temperature Tsa_th. For example, the opening-closing unit 14 may be configured to increase the opening degree in proportion to this difference. In this case, when the threshold outlet temperature Tsa_th is constant, the supply-air temperature Tsa is decreased as the difference is increased. At this time, the opening degree of the opening-closing unit 14 is increased to increase the flowing amount of the indoor outlet air SR. Thus, the supply air SA is more heated.

Further, the opening degree control unit 63 has a function of controlling the opening-closing unit 14 to close the joining unit 13 when the first determining unit 61 determines that the indoor outlet temperature Tsr is equal to or lower than the supply-air temperature Tsa. In addition, the opening degree control unit 63 has a function of controlling the opening-closing unit 14 to close the joining unit 13 when the second determining unit 62 determines that the supply-air temperature Tsa is equal to or higher than the threshold outlet temperature Tsa_th.

Figure 6:
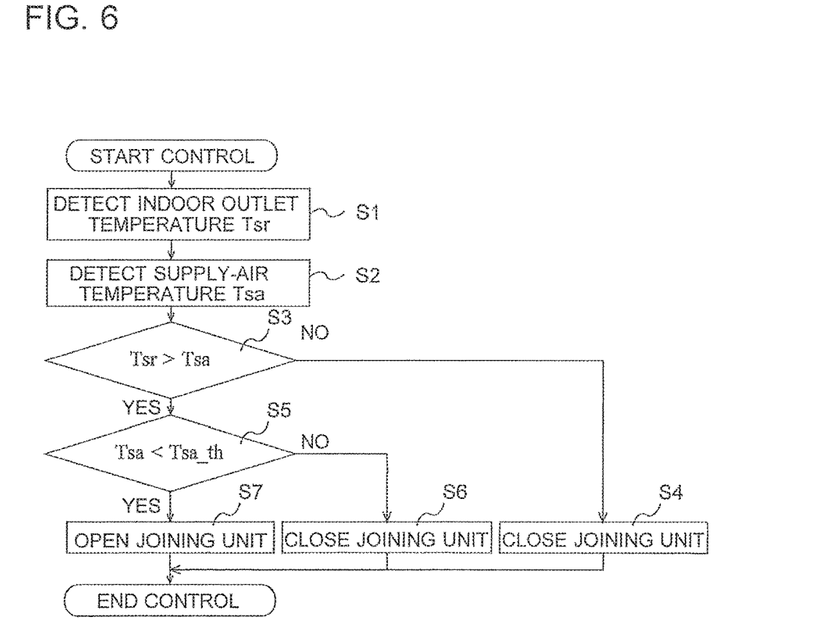
FIG. 6 is a flow chart for illustrating the operation of the air-conditioning apparatus 2 according to Embodiment 1.

Next, the operation of the outside-air processing device 1 according to Embodiment 1 is described. FIG. 6 is a flow chart for illustrating the operation of the air-conditioning apparatus 2 according to Embodiment 1. As illustrated in FIG. 6, after the control is started, first, the indoor outlet temperature detecting unit 28 detects the indoor outlet temperature Tsr (Step S1). Then, the supply-air temperature detecting unit 53 detects the supply-air temperature Tsa (Step S2).

Then, the first determining unit 61 determines whether or not the indoor outlet temperature Tsr detected by the indoor outlet temperature detecting unit 28 is higher than the supply-air temperature Tsa detected by the supply-air temperature detecting unit 53 (Step S3). When the first determining unit 61 determines that the indoor outlet temperature Tsr is equal to or lower than the supply-air temperature Tsa (No in Step S3), the opening degree control unit 63 controls the opening-closing unit 14 to close the joining unit 13 (Step S4). Then, the control is ended.

On the other hand, in Step S3, when the first determining unit 61 determines that the indoor outlet temperature Tsr is higher than the supply-air temperature Tsa (Yes in Step S3), the second determining unit 62 determines whether or not the supply-air temperature Tsa detected by the supply-air temperature detecting unit 53 is lower than the predetermined threshold outlet temperature Tsa_th (Step S5). As described above, the threshold outlet temperature Tsa_th is set to be decreased as the difference between the set outlet temperature or set room temperature and the current actual room temperature inside the room 8 is increased. The threshold outlet temperature Tsa_th can be set to be increased as time elapses.

When the second determining unit 62 determines that the supply-air temperature Tsa is equal to or higher than the threshold outlet temperature Tsa_th (No in Step S5), the opening degree control unit 63 controls the opening-closing unit 14 to close the joining unit 13 (Step S6). Then, the control is ended.

On the other hand, in Step S5, when the second determining unit 62 determines that the supply-air temperature Tsa is lower than the threshold outlet temperature Tsa_th (Yes in Step S5), the opening degree control unit 63 controls the opening-closing unit 14 to open the joining unit 13 (Step S7). The opening degree of the opening-closing unit 14 is controlled based on the difference obtained by subtracting the supply-air temperature Tsa from the threshold outlet temperature Tsa_th. Then, the control is ended.

As described above, in the air-conditioning apparatus 2 according to Embodiment 1, the control unit 60 is configured to control the operation of the opening-closing unit 14 based on the supply-air temperature Tsa and the indoor outlet temperature Tsr, and this opening-closing unit 14 opens the joining unit 13 to introduce the indoor outlet air SR to the supply air SA through the joining unit 13. With this configuration, the comfort of the residents can be enhanced while the increase in cost is minimized.

Further, during the cooling operation, even when the supply air SA blown out from the outside-air processing device 1 into the room 8 is reduced in temperature, the supply air SA is heated by being mixed with the warm indoor outlet air SR. Consequently, the supply air SA to be blown out into the room 8 is heated, and thus the comfort of the residents can be enhanced. Further, in Embodiment 1, to achieve this effect, a reheating function is not required to be added, and hence the increase in cost of the air-conditioning apparatus 2 can be minimized.

Further, when the first determining unit 61 determines that the indoor outlet temperature Tsr is equal to or lower than the supply-air temperature Tsa, the opening degree control unit 63 controls the opening-closing unit 14 to close the joining unit 13. When the indoor outlet temperature Tsr is equal to or lower than the supply-air temperature Tsa, even when the indoor outlet air SR is mixed to the supply air SA, the supply air SA is cooled. In Embodiment 1, the opening degree control unit 63 controls the opening-closing unit 14 to close the joining unit 13, and hence the cooling of the supply air SA can be prevented.

Further, when the second determining unit 62 determines that the supply-air temperature Tsa is equal to or higher than the threshold outlet temperature Tsa_th, the opening degree control unit 63 controls the opening-closing unit 14 to close the joining unit 13. Even when the indoor outlet temperature Tsr is higher than the supply-air temperature Tsa, as long as the supply-air temperature Tsa is equal to or higher than the threshold outlet temperature Tsa_th, the supply air SA is not required to be heated. In Embodiment 1, the opening degree control unit 63 controls the opening-closing unit 14 to close the joining unit 13, and hence excessive cooling of the supply air SA can be prevented.

The threshold outlet temperature Tsa_th is set to be decreased as the difference between the set outlet temperature or set room temperature and the current actual room temperature inside the room 8 is increased. Consequently, for example, when the room temperature inside the room 8 is high as in summer, the threshold outlet temperature Tsa_th is set to be low, and thus the second determining unit 62 tends to determine that the supply-air temperature Tsa is equal to or higher than the threshold outlet temperature Tsa_th. Consequently, the opening degree control unit 63 tends to control the opening-closing unit 14 to close the joining unit 13, and thus the supply air SA is not heated. Subsequently, the supply air SA remains cold, and when the room temperature inside the room 8 is high as described below, the room 8 can be immediately cooled. Subsequently, the load at the time of activation can be reduced, and hence energy can be saved.

Still further, when the second determining unit 62 determines that the supply-air temperature Tsa is lower than the threshold outlet temperature Tsa_th, in Step S7, the opening degree control unit 63 controls the opening-closing unit 14 to open the joining unit 13. When the indoor outlet temperature Tsr is higher than the supply-air temperature Tsa, and when the supply-air temperature Tsa is lower than the threshold outlet temperature Tsa_th, the supply air SA is required to be heated. In Embodiment 1, the opening degree control unit 63 controls the opening-closing unit 14 to open the joining unit 13. Consequently, the indoor outlet air SR is mixed to the supply air SA, and thus the supply air SA is heated. Consequently, the supply air SA to be blown out into the room 8 is heated, and thus the comfort of the residents can be enhanced.

In Embodiment 1, as described above, the evaporating temperature of the refrigerant can be adjusted depending on the indoor load by the frequency adjusting unit 21a. For example, when the indoor load is low, the evaporating temperature of the refrigerant can be increased to increase the indoor outlet temperature Tsr of the indoor outlet air SR to be blown out from the indoor outlet port 29 of the indoor unit 3. In this case, the determination of Step S3 is easy to be achieved. Further, the chamber outlet port 16 is of a radial flow type, and its structure is optimized in consideration of a room, that is, a living region. Consequently, the comfort can be secured.

Embodiment 2

Figure 7:
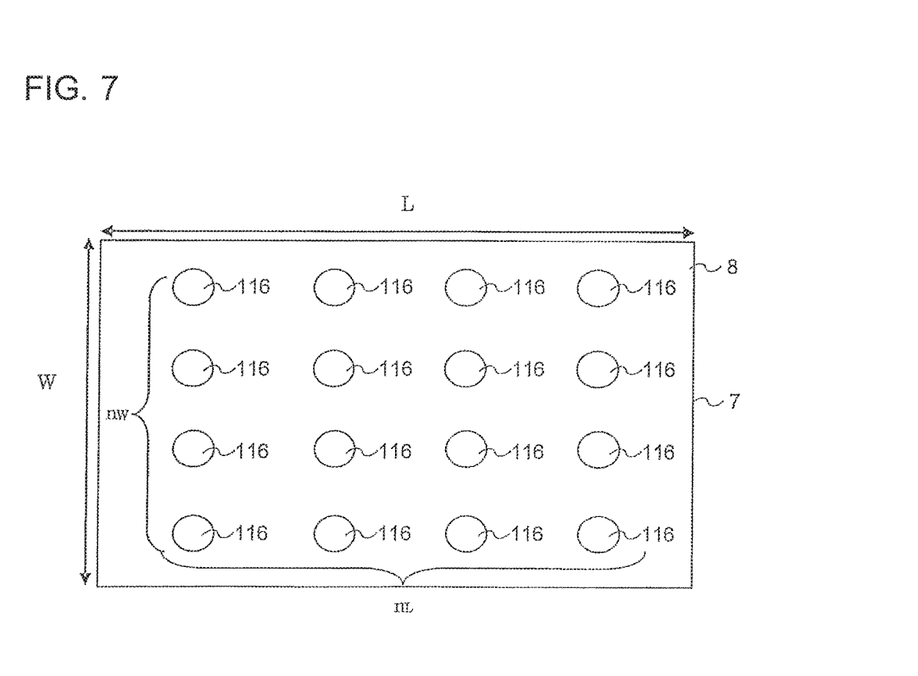
FIG. 7 is a schematic view for illustrating leading end outlet ports 116 according to Embodiment 2 of the present invention.
Figure 8:
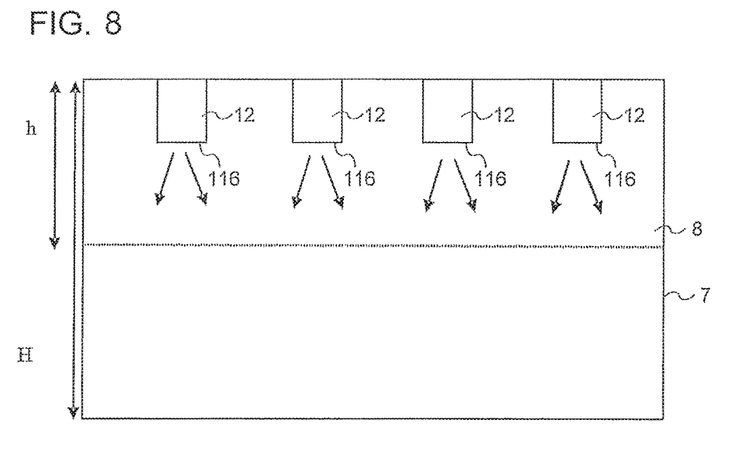
FIG. 8 is a schematic view for illustrating the leading end outlet ports 116 according to Embodiment 2.

Next, an air-conditioning apparatus 102 according to Embodiment 2 of the present invention is described. FIG. 7 and FIG. 8 are schematic views for illustrating chamber outlet ports 116 according to Embodiment 2. Embodiment 2 differs from Embodiment 1 in that the chamber outlet ports 116 corresponding to the chamber outlet port 16 of Embodiment 1 have an axial flow-type shape instead of a radial flow-type shape. In Embodiment 2, parts common to Embodiment 1 are denoted by the same reference signs, and descriptions of the common parts are omitted. Differences from Embodiment 1 are mainly described.

In Embodiment 2, the chamber outlet ports 116 each have an axial flow-type shape in which the mixed air becomes an axisymmetric jet flow. As illustrated in FIG. 7 and FIG. 8, for example, the length of one side of the rectangular room 8 of the building 7 in which the air-conditioning apparatus 102 is installed is represented by L, the length of the other side is represented by W, the number of the chamber outlet ports 116 arranged in parallel to the one side is represented by nl, the number of the chamber outlet ports 116 arranged in parallel to the other side is represented by nw, and the height in an upper part of the room 8 higher than the lower half of a height H of the room 8 in the height direction is represented by h. In this case, the number of the chamber outlet ports 116 is obtained by multiplying nl by nw, that is, nl× nw=n. Further, a cooling load is represented by Qc (kcal/s), and the difference between the temperature of the mixed air and the temperature of the room 8 is represented by $\delta t_0$ (° C.).

At least one of the number n of the chamber outlet ports 116 or a diameter Doc of the chamber outlet port 116 is calculated based on Expression (4), Expression (5), and Expression (6) so that the air streams of the mixed air overlap in the upper part of the room 8, that the wind velocity of the overlapping air streams does not exceed the wind velocity on the center axis of the chamber outlet port 116, and that the wind velocity of the air streams in the upper part of the room 8 during cooling is equal to or less than 0.5 (m/s).

[Math. 4]
$$0.4K\frac{L}{h} \le nl \le 1.3K\frac{L}{h} \quad (4)$$

[Math. 5]
$$0.4K\frac{W}{h} \le nw \le 1.3K\frac{W}{h} \quad (5)$$

[Math. 6]
$$Doc \ge \frac{8.5\frac{K}{h}\frac{Qc}{n}\frac{1}{\delta t_0}}{\left(1 - 2.1\frac{K^2}{h}\frac{Qc}{n}\right)^3} \quad (6)$$

As described above, in Embodiment 2, the chamber outlet port 116 has an axial flow-type shape, but Embodiment 2 has effects similar to those in Embodiment 1. The shape of the chamber outlet port 116 may be variable between the axial flow type and the radial flow type as in Embodiment 1, depending on the supply-air temperature Tsa, the indoor outlet temperature Tsr, or other temperatures.

Embodiment 3

Figure 9:
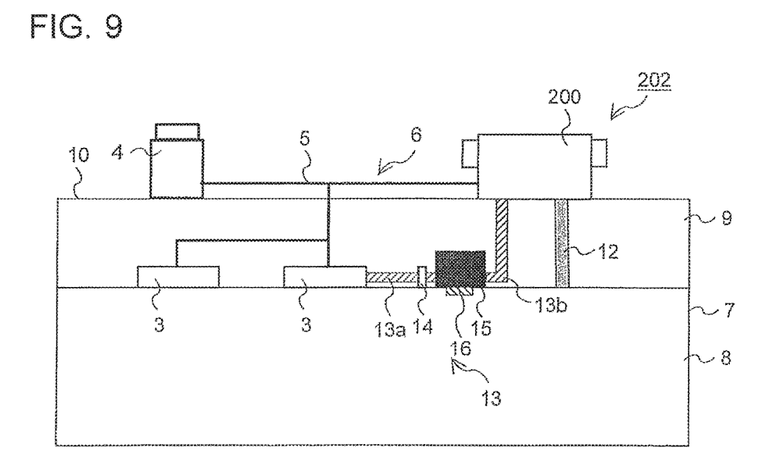
FIG. 9 is a schematic view for illustrating an air-conditioning apparatus 202 according to Embodiment 3 of the present invention.

Next, an air-conditioning apparatus 202 according to Embodiment 3 of the present invention is described. FIG. 9 is a schematic view for illustrating the air-conditioning apparatus 202 according to Embodiment 3. Embodiment 3 differs from Embodiment 1 in that an outside-air processing device 200 is installed on the rooftop 10 of the building 7. In Embodiment 3, parts common to Embodiment 1 are denoted by the same reference signs, and the descriptions of the common parts are omitted. Differences from Embodiment 1 are mainly described.

In Embodiment 3, as illustrated in FIG. 9, the outside-air processing device 200 is installed on the rooftop 10 of the building 7. Further, the outside-air processing device 200 is connected to the room 8 through the joining unit 13 and the indoor duct 12. With this configuration, the return air RA is introduced and the supply air SA is blown out. Further, the outside-air processing device 200 is directly connected to the outside of the room without using the outdoor duct 11. The air-conditioning apparatus 202 according to Embodiment 3 has effects similar to those of Embodiment 1.

Embodiment 4

Figure 10:
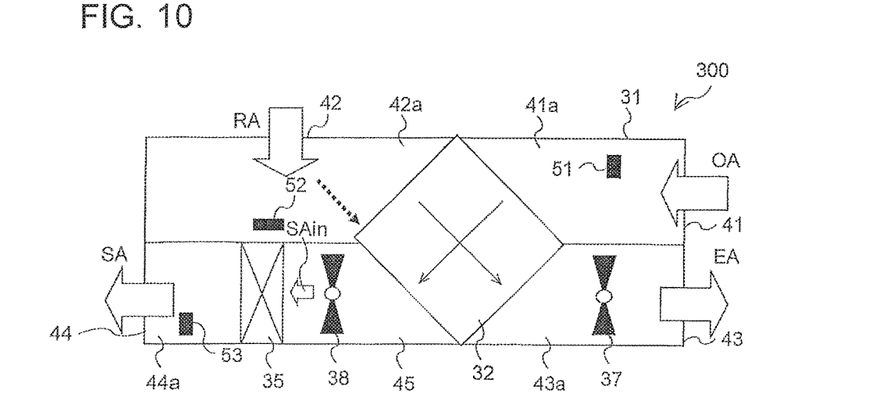
FIG. 10 is a schematic view for illustrating an outside-air processing device 300 according to Embodiment 4 of the present invention.

Next, an air-conditioning apparatus 302 according to Embodiment 4 of the present invention is described. FIG. 10 is a schematic view for illustrating an outside-air processing device 300 according to Embodiment 3. Embodiment 4 differs from Embodiment 1 in the position at which the return-air introducing port 42 is formed in the main body 31 of the outside-air processing device 300. In Embodiment 4, parts common to Embodiment 1 are denoted by the same reference signs, and the descriptions of the common parts are omitted. Differences from Embodiment 1 are mainly described.

In Embodiment 4, as illustrated in FIG. 10, the return-air introducing port 42 is formed at an upper portion of the main body 31 of the outside-air processing device 300. In this manner, the position at which the return-air introducing port 42 is formed can be appropriately changed. Further, in FIG. 10, the return-air introducing port 42 is formed so that the direction in which the outdoor air OA flows and the direction in which the return air RA flows are perpendicular to each other. When the outside-air processing device 300 is installed on the rooftop 10 of the building 7 similarly to the outside-air processing device 200 according to Embodiment 3, the return-air introducing port 42 formed as described above is particularly effective because the outside-air processing device 300 is easily connected to the inside of the room 8.

Embodiment 5

Figure 11:
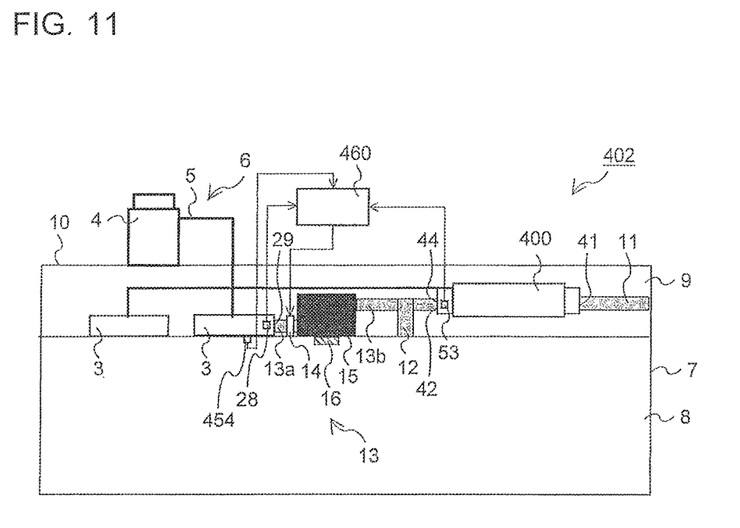
FIG. 11 is a schematic view for illustrating an air-conditioning apparatus 402 according to Embodiment 5 of the present invention.

Next, an air-conditioning apparatus 402 according to Embodiment 5 of the present invention is described. FIG. 11 is a schematic view for illustrating an air-conditioning apparatus 402 according to Embodiment 5. Embodiment 5 differs from Embodiment 1 in that a human detecting unit 454 is provided, and further differs from Embodiment 1 in a configuration of a control unit 460. In Embodiment 5, parts common to Embodiment 1 are denoted by the same reference signs, and the descriptions of the common parts are omitted. Differences from Embodiment 1 are mainly described.

Figure 12:
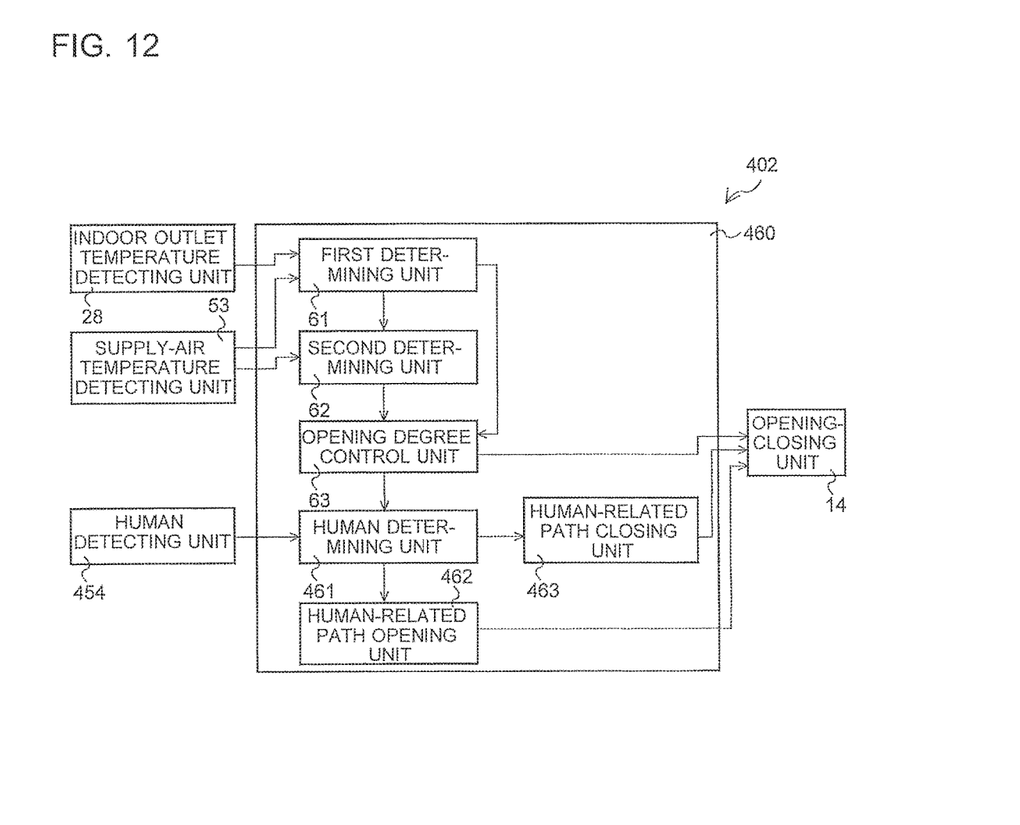
FIG. 12 is a block diagram for illustrating a control unit 460 according to Embodiment 5.

As illustrated in FIG. 11, the air-conditioning apparatus 402 includes the human detecting unit 454 configured to detect the presence or absence of a human. FIG. 12 is a block diagram for illustrating the control unit 460 according to Embodiment 5. As illustrated in FIG. 12, similarly to Embodiment 1, the control unit 460 includes the first determining unit 61, the second determining unit 62, and the opening degree control unit 63, and in addition, includes a human determining unit 461, a human-related path closing unit 463, and a human-related path opening unit 462.

The human determining unit 461 is configured to determine whether or not a human is detected by the human detecting unit 454. Further, when the human determining unit 461 determines that no human is present, the human-related path closing unit 463 controls the opening-closing unit 14 to close the joining unit 13. Further, when the human determining unit 461 determines that a human is present, the human-related path opening unit 462 controls the opening-closing unit 14 to open the joining unit 13.

Figure 13:
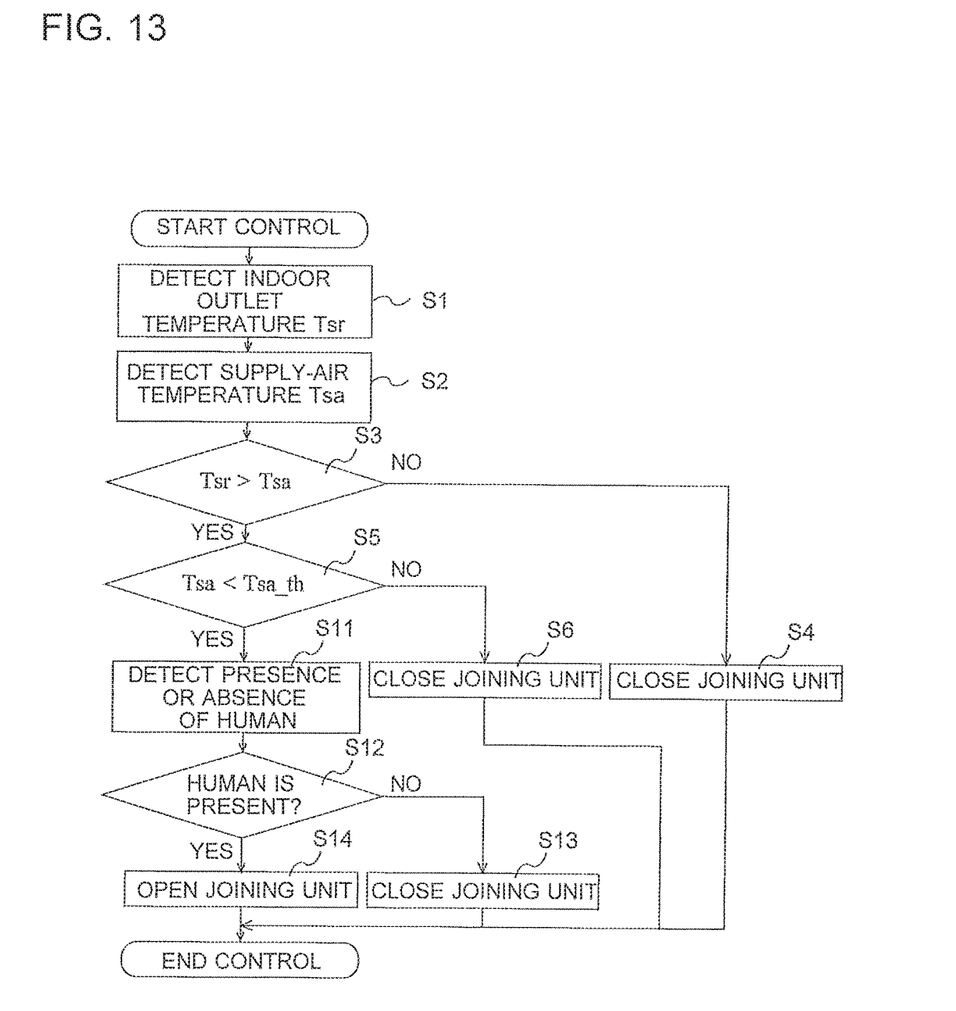
FIG. 13 is a flow chart for illustrating the operation of the air-conditioning apparatus 402 according to Embodiment 5.

Next, the operation of the air-conditioning apparatus 402 according to Embodiment 5 is described. FIG. 13 is a flow chart for illustrating the operation of the air-conditioning apparatus 402 according to Embodiment 5. As illustrated in FIG. 13, after the control is started, first, the indoor outlet temperature detecting unit 28 detects the indoor outlet temperature Tsr (Step S1). Then, the supply-air temperature detecting unit 53 detects the supply-air temperature Tsa (Step S2).

Then, the first determining unit 61 determines whether or not the indoor outlet temperature Tsr detected by the indoor outlet temperature detecting unit 28 is higher than the supply-air temperature Tsa detected by the supply-air temperature detecting unit 53 (Step S3). When the first determining unit 61 determines that the indoor outlet temperature Tsr is equal to or lower than the supply-air temperature Tsa (No in Step S3), the opening degree control unit 63 controls the opening-closing unit 14 to close the joining unit 13 (Step S4). Then, the control is ended.

On the other hand, in Step S3, when the first determining unit 61 determines that the indoor outlet temperature Tsr is higher than the supply-air temperature Tsa (Yes in Step S3), the second determining unit 62 determines whether or not the supply-air temperature Tsa detected by the supply-air temperature detecting unit 53 is lower than the predetermined threshold outlet temperature Tsa_th (Step S5). As described above, the threshold outlet temperature Tsa_th is set to be decreased as the temperature of the room 8 is increased. The threshold outlet temperature Tsa_th can be set to be increased as time elapses. When the second determining unit 62 determines that the supply-air temperature Tsa is equal to or higher than the threshold outlet temperature Tsa_th (No in Step S5), the opening degree control unit 63 controls the opening-closing unit 14 to close the joining unit 13 (Step S6). Then, the control is ended.

On the other hand, in Step S5, when the second determining unit 62 determines that the supply-air temperature Tsa is lower than the threshold outlet temperature Tsa_th (Yes in Step S5), the human detecting unit 454 detects the presence or absence of a human (Step S11). Then, the human determining unit 461 determines whether or not a human is detected by the human detecting unit 454 (Step S12). When the human determining unit 461 determines that no human is present (No in Step S12), the human-related path closing unit 463 controls the opening-closing unit 14 to close the joining unit 13 (Step S13). Then, the control is ended.

Meanwhile, in Step S12, when the human determining unit 461 determines that a human is present (Yes in Step S12), the human-related path opening unit 462 controls the opening-closing unit 14 to open the joining unit 13 (Step S14). Then, the control is ended.

As described above, in the air-conditioning apparatus 402 according to Embodiment 5, when the human determining unit 461 determines that no human is present, in Step S13, the human-related path closing unit 463 controls the opening-closing unit 14 to close the joining unit 13. In a region in which no human is present, the supply air SA is not required to be heated. In Embodiment 5, the human-related path closing unit 463 controls the opening-closing unit 14 to close the joining unit 13, and hence needless cooling of the supply air SA can be prevented.

Further, when the human determining unit 461 determines that a human is present, in Step S14, the human-related path opening unit 462 controls the opening-closing unit 14 to open the joining unit 13. Subsequently, in a region in which a human is present, the heated supply air SA by being mixed with the indoor outlet air SR is blown out. Consequently, the comfort of the residents can be enhanced.

The air-conditioning apparatus can be obtained by combining the configurations of Embodiments 2 to 4 with the configuration of Embodiment 5. Further, the air-conditioning system can include the air-conditioning apparatus and the control unit provided separately from each other.

REFERENCE SIGNS LIST 1 outside-air processing device 2 air-conditioning apparatus 3 indoor unit 4 outdoor unit 5 pipe 6 refrigerant circuit 7 building 8 room 9 space above ceiling 10 rooftop 11 outdoor duct 12 indoor duct 13 joining unit 13a indoor outlet duct 13b supply-air duct 14 opening-closing unit 15 mixing chamber 16 chamber outlet port 21 compressor 21a frequency adjusting unit 21b evaporating temperature detecting unit 22 four-way valve 23 outdoor heat exchanger 24 outdoor fan 25 expansion unit 26 indoor heat exchanger 26a suction temperature detecting unit 27 indoor fan indoor outlet temperature detecting unit 29 indoor outlet port 31 main body 32 total heat exchanger 35 outside-air processing heat exchanger 36 outside-air processing expansion unit 37 exhaust-air fan 38 supply-air outlet fan 41 outside-air introducing port 41a outside-air path 42 return-air introducing port 42a return-air path 43 exhaust-air port 43a exhaust-air path 44 supply-air outlet port 44a supply-air outlet path 45 inflow path 51 outdoor-air temperature detecting unit 52 return-air temperature detecting unit 53 supply-air temperature detecting unit 60 control unit 61 first determining unit 62 second determining unit 63 opening degree control unit 102 air-conditioning apparatus 116 leading end outlet port 200 outside-air processing device 202 air-conditioning apparatus 300 outside-air processing device 302 air-conditioning apparatus 400 outside-air processing device 402 air-conditioning apparatus 454 human detecting unit 460 control unit 461 human determining unit 462 human-related path opening unit 463 human-related path closing unit

The invention claimed is:

1. An air-conditioning apparatus, comprising:
an outside-air processing device including a total heat exchanger configured to exchange heat between outdoor air and a first flow of return air, the outside-air processing device introducing the heat-exchanged outdoor air from a supply-air outlet port into a room as supply air;
an indoor unit including an indoor heat exchanger configured to exchange heat between a second flow of return air and refrigerant, the indoor unit introducing the heat-exchanged second flow of return air from an indoor outlet port as indoor outlet air;
a joining unit configured to connect the supply-air outlet port and the indoor outlet port to each other so that the supply air and the indoor outlet air are joined with each other at the joining unit;
an opening-closing unit arranged on a side of the indoor outlet port in the joining unit and configured to adjust a flowing amount of the indoor outlet air flowing through the joining unit;
a supply-air temperature detecting unit configured to detect a supply-air temperature of the supply air;
an indoor outlet temperature detecting unit configured to detect an indoor outlet temperature of the indoor outlet air; and
a control unit configured to control an operation of the opening-closing unit based on the supply-air temperature detected by the supply-air temperature detecting unit and the indoor outlet temperature detected by the indoor outlet temperature detecting unit.

2. The air-conditioning apparatus of claim 1, wherein the control unit includes
a first determining unit configured to determine whether or not the indoor outlet temperature detected by the indoor outlet temperature detecting unit is higher than the supply-air temperature detected by the supply-air temperature detecting unit,
a second determining unit configured to, when the first determining unit determines that the indoor outlet temperature is higher than the supply-air temperature, determine whether or not the supply-air temperature is lower than a predetermined threshold outlet temperature, and
an opening degree control unit configured to control an opening degree of the opening-closing unit based on a determination result of the first determining unit and a determination result of the second determining unit.

3. The air-conditioning apparatus of claim 2, wherein the opening degree control unit is configured to, when the second determining unit determines that the supply-air temperature is lower than the predetermined threshold outlet temperature, control the opening-closing unit to open the joining unit.

4. The air-conditioning apparatus of claim 2, wherein the opening degree control unit is configured to, when the first determining unit determines that the indoor outlet temperature is equal to or lower than the supply-air temperature, control the opening-closing unit to close the joining unit.

5. The air-conditioning apparatus of claim 2, wherein the opening degree control unit is configured to, when the second determining unit determines that the supply-air temperature is equal to or higher than the predetermined threshold outlet temperature, control the opening-closing unit to close the joining unit.

6. The air-conditioning apparatus of claim 2, wherein the opening degree control unit is configured to control an opening degree of the opening-closing unit to adjust the flowing amount of the indoor outlet air flowing through the joining unit, based on a difference obtained by subtracting the supply-air temperature from the predetermined threshold outlet temperature.

7. The air-conditioning apparatus of claim 2, wherein the predetermined threshold outlet temperature is set to be decreased as a difference between a set outlet temperature or a set room temperature and an actual room temperature inside the room is increased.

8. The air-conditioning apparatus of claim 1, further comprising
a human detecting unit configured to detect presence or absence of a human, the control unit further including
a human determining unit configured to determine whether or not a human is detected by the human detecting unit,
a human-related path closing unit configured to, when the human determining unit determines that no human is present, control the opening-closing unit to close the joining unit, and
a human-related path opening unit configured to, when the human determining unit determines that a human is present, control the opening-closing unit to open the joining unit.

9. The air-conditioning apparatus of claim 1, further comprising
a mixing chamber arranged in the joining unit on a downstream side of the opening-closing unit, and configured to mix the supply air and the indoor outlet air with each other.

10. The air-conditioning apparatus of claim 1, wherein the outside-air processing device includes
an outside-air processing heat exchanger configured to exchange heat between refrigerant and inflow air being the outdoor air heat-exchanged by the total heat exchanger and caused to flow into the outside-air processing heat exchanger, and
an outside-air processing expansion unit configured to expand the refrigerant.

11. The air-conditioning apparatus of claim 1, further comprising
a refrigerant circuit connecting, by a pipe, the outside-air processing device, a compressor, an outdoor heat exchanger, an expansion unit, and the indoor heat exchanger.

12. An air-conditioning system, comprising:
an air-conditioning apparatus; and
a control unit configured to control an operation of the air-conditioning apparatus, the air-conditioning apparatus including
- an outside-air processing device including a total heat exchanger configured to exchange heat between outdoor air and a first flow of return air, the outside-air processing device introducing the heat-exchanged outdoor air from a supply-air outlet port into a room as supply air,
- an indoor unit including an indoor heat exchanger configured to exchange heat between a second flow of return air and refrigerant, and to introduce the indoor unit introducing the heat-exchanged the second flow of return air from an indoor outlet port as indoor outlet air,
- a joining unit configured to connect the supply-air outlet port and the indoor outlet port to each other so that the supply air and the indoor outlet air are joined with each other at the joining unit,
- an opening-closing unit arranged on a side of the indoor outlet port in the joining unit and configured to adjust a flowing amount of the indoor outlet air flowing through the joining unit,
- a supply-air temperature detecting unit configured to detect a supply-air temperature of the supply air, and
- an indoor outlet temperature detecting unit configured to detect an indoor outlet temperature of the indoor outlet air, the control unit being configured to control an operation of the opening-closing unit based on the supply-air temperature detected by the supply-air temperature detecting unit and the indoor outlet temperature detected by the indoor outlet temperature detecting unit.

* * * * *